(12) United States Patent
Carlson et al.

(10) Patent No.: US 8,887,655 B2
(45) Date of Patent: Nov. 18, 2014

(54) VALVE ACTUATOR WITH POSITION INDICATOR EXTENSION

(75) Inventors: Nathan Carlson, Maple Grove, MN (US); Tom Bakken, Apple Valley, MN (US); Ryan Bents, Stacy, MN (US)

(73) Assignee: Honeywell International Inc., Morristown, NJ (US)

( * ) Notice: Subject to any disclaimer, the term of this patent is extended or adjusted under 35 U.S.C. 154(b) by 360 days.

(21) Appl. No.: 13/358,435

(22) Filed: Jan. 25, 2012

(65) Prior Publication Data
US 2013/0187073 A1    Jul. 25, 2013

(51) Int. Cl.
*F16K 37/00* (2006.01)
*F16K 31/44* (2006.01)
*F16K 31/60* (2006.01)

(52) U.S. Cl.
USPC .......................................... 116/277; 137/553

(58) Field of Classification Search
CPC ........... F16K 5/00; F16K 31/44; F16K 31/60; F16K 31/602; F16K 37/00; F16K 31/0008; F16K 31/0016
USPC ............ 116/277; 137/553, 556, 556.3, 556.6; 16/422, 426, 427, 429
See application file for complete search history.

(56) References Cited

U.S. PATENT DOCUMENTS

| | | | |
|---|---|---|---|
| 940,182 A | 11/1909 | Morgan et al. | |
| 1,613,322 A | 1/1927 | Goetz | |
| 2,465,162 A | 3/1949 | Lockwood | |
| 2,616,452 A | 11/1952 | Clay et al. | |
| 2,745,360 A | 5/1956 | Lunde | |
| 3,117,257 A | 1/1964 | Stone | |
| 3,143,137 A | 8/1964 | Muller | |
| 3,262,027 A | 7/1966 | Zaleske et al. | |
| 3,276,480 A | 10/1966 | Kennedy | |
| 3,279,744 A | 10/1966 | Fieldsen et al. | |
| 3,295,079 A | 12/1966 | Brown | |
| 3,521,659 A | 7/1970 | Seger | |
| 3,727,160 A | 4/1973 | Churchill | |

(Continued)

FOREIGN PATENT DOCUMENTS

| | | | |
|---|---|---|---|
| CN | 101424504 | 5/2009 | |
| CN | 201246519 Y | * 5/2009 | .............. F16K 31/60 |

(Continued)

OTHER PUBLICATIONS

Derwent 2013-S88986 abstract of CN 203051926 U, titled "Valve folding handle, main body whose upper end surface is provided with strip-shaped sliding groove, and sliding rod hinged with pull rod, where inner wall of sliding rod is connected with main body", published Jul. 10, 2013, Inventor: Zhuo D, Assignee: Zhuo D[Zhuoi].*

(Continued)

*Primary Examiner* — R. A. Smith
(74) *Attorney, Agent, or Firm* — Seager Tufte & Wickhem LLC.

(57) ABSTRACT

A valve actuator assembly includes a rotatable member carrying an extendable indicator arm. The extendable indicator arm may be moveable between a retracted position and an extended position. When the extendable indicator arm is in the extended position, the extendable indicator arm may extend laterally past side walls of the actuator housing of the valve actuator assembly, such that the extendable indicator arm is visible from a location below the valve actuator assembly.

17 Claims, 11 Drawing Sheets

(56) References Cited

U.S. PATENT DOCUMENTS

| | | |
|---|---|---|
| 3,817,452 A | 6/1974 | Dean, Jr. |
| 3,847,210 A | 11/1974 | Wells |
| 4,088,150 A | 5/1978 | Serratto |
| 4,319,714 A | 3/1982 | Moulene et al. |
| D267,335 S | 12/1982 | Axel et al. |
| 4,379,605 A | 4/1983 | Hoffman |
| 4,487,363 A | 12/1984 | Parker et al. |
| 4,534,538 A | 8/1985 | Buckley et al. |
| 4,549,446 A | 10/1985 | Beeson |
| D286,907 S | 11/1986 | Hilpert et al. |
| 4,671,540 A | 6/1987 | Medvick et al. |
| 4,683,453 A | 7/1987 | Vollmer et al. |
| 4,691,689 A | 9/1987 | Shepherd et al. |
| 4,732,318 A | 3/1988 | Osheroff |
| D295,280 S | 4/1988 | Walser |
| 4,805,870 A | 2/1989 | Mertz |
| 4,829,447 A | 5/1989 | Parker et al. |
| 4,836,497 A | 6/1989 | Beeson |
| 4,841,733 A | 6/1989 | Dussault et al. |
| 5,052,537 A | 10/1991 | Tysver et al. |
| 5,133,265 A | 7/1992 | Lahti et al. |
| 5,236,006 A | 8/1993 | Platusich et al. |
| 5,249,596 A | 10/1993 | Hickenlooper, III et al. |
| 5,338,221 A | 8/1994 | Bowen et al. |
| D359,103 S | 6/1995 | Bouc et al. |
| 5,518,462 A | 5/1996 | Yach |
| 5,540,414 A | 7/1996 | Giordani et al. |
| 5,551,477 A | 9/1996 | Kanno et al. |
| 5,564,461 A | 10/1996 | Raymond, Jr. et al. |
| 5,581,232 A | 12/1996 | Tanaka et al. |
| 5,588,682 A | 12/1996 | Breese |
| 5,634,486 A | 6/1997 | Hatting et al. |
| 5,806,555 A | 9/1998 | Magno, Jr. |
| 5,808,534 A | 9/1998 | Laffey |
| 5,819,791 A | 10/1998 | Chronister et al. |
| 5,835,981 A | 11/1998 | Smith |
| 5,944,224 A | 8/1999 | Hodge et al. |
| 5,954,088 A | 9/1999 | Huang |
| 6,073,907 A | 6/2000 | Schreiner, Jr. et al. |
| 6,422,258 B1 | 7/2002 | DuHack et al. |
| D480,450 S | 10/2003 | Saadi et al. |
| 6,681,791 B1 * | 1/2004 | Chorney et al. ............ 137/15.01 |
| 6,684,901 B1 | 2/2004 | Cahill et al. |
| 6,742,765 B2 | 6/2004 | Takano et al. |
| 6,789,781 B2 | 9/2004 | Johnson et al. |
| D498,821 S | 11/2004 | Nortier |
| 6,848,672 B2 | 2/2005 | Cross et al. |
| 6,880,806 B2 | 4/2005 | Haikawa et al. |
| 6,920,896 B2 | 7/2005 | Kerger et al. |
| 6,932,319 B2 | 8/2005 | Kowalski |
| 6,994,320 B2 | 2/2006 | Johnson et al. |
| 7,024,527 B1 | 4/2006 | Ohr |
| 7,036,791 B2 | 5/2006 | Wiese |
| 7,041,902 B1 | 5/2006 | Savicki, Jr. et al. |
| 7,048,251 B2 | 5/2006 | Schreiner |
| 7,131,635 B2 | 11/2006 | Oh |
| 7,137,408 B2 | 11/2006 | Royse |
| 7,188,481 B2 | 3/2007 | DeYoe et al. |
| D543,003 S | 5/2007 | Helmetsie |
| 7,260,899 B2 | 8/2007 | Jones |
| D552,643 S | 10/2007 | Bonomi |
| 7,347,716 B2 | 3/2008 | Osterhaus et al. |
| 7,354,319 B2 | 4/2008 | Camino et al. |
| D571,290 S | 6/2008 | Gebhart et al. |
| 7,395,718 B2 | 7/2008 | Obermeier |
| 7,428,626 B2 | 9/2008 | Vega |
| 7,470,143 B2 | 12/2008 | Osborn, Jr. et al. |
| D587,211 S | 2/2009 | Greenslade |
| D600,319 S | 9/2009 | Downing |
| 7,600,327 B2 | 10/2009 | Sharp |
| 7,631,155 B1 | 12/2009 | Bono et al. |
| 7,640,677 B2 | 1/2010 | Vock et al. |
| D609,319 S | 2/2010 | Ohno et al. |
| D610,655 S | 2/2010 | Schmidt |
| D614,150 S | 4/2010 | Crites |
| 7,704,008 B2 | 4/2010 | Shinozaki et al. |
| D616,067 S | 5/2010 | Cavagna |
| 7,708,254 B2 | 5/2010 | Hertzog |
| D621,909 S | 8/2010 | Parsons et al. |
| 7,769,861 B2 | 8/2010 | Bendich et al. |
| 7,805,564 B2 | 9/2010 | Matsunami et al. |
| D629,069 S | 12/2010 | Parsons et al. |
| D629,871 S | 12/2010 | Marinoni et al. |
| D631,944 S | 2/2011 | Karmel et al. |
| D634,813 S | 3/2011 | Hernandez, IV |
| 7,914,872 B2 | 3/2011 | Leonard et al. |
| 7,937,527 B2 | 5/2011 | Matsunami et al. |
| 8,051,244 B2 | 11/2011 | Matsunami et al. |
| D650,337 S | 12/2011 | Bonomi |
| 8,083,205 B2 | 12/2011 | Sneh |
| D654,523 S | 2/2012 | Iranyi et al. |
| 8,122,911 B2 | 2/2012 | Wark |
| 8,341,350 B2 | 12/2012 | Jess et al. |
| 8,353,716 B2 | 1/2013 | Keswani |
| D675,714 S | 2/2013 | Nguyen |
| 8,386,708 B2 | 2/2013 | Jess |
| D680,141 S | 4/2013 | Sannomiya |
| D686,297 S | 7/2013 | Laugen et al. |
| D687,070 S | 7/2013 | Liao |
| D691,703 S | 10/2013 | Iranyi et al. |
| D697,585 S | 1/2014 | Liu et al. |
| 8,645,662 B2 | 2/2014 | Burton et al. |
| 2004/0099833 A1 | 5/2004 | Haikawa et al. |
| 2008/0116288 A1 | 5/2008 | Takach et al. |
| 2011/0220009 A1 | 9/2011 | Betts et al. |
| 2011/0240893 A1 | 10/2011 | Windgassen |
| 2012/0119131 A1 * | 5/2012 | Strebe ........................ 251/356 |
| 2012/0199776 A1 | 8/2012 | Kreuter |
| 2012/0211688 A1 * | 8/2012 | Carlson et al. ............. 251/291 |
| 2012/0325338 A1 | 12/2012 | Pettinaroli et al. |
| 2013/0054932 A1 | 2/2013 | Acharya et al. |
| 2013/0333502 A1 | 12/2013 | Barton et al. |
| 2013/0333784 A1 | 12/2013 | Marak et al. |
| 2013/0334325 A1 | 12/2013 | Marak et al. |
| 2013/0337736 A1 | 12/2013 | Marak et al. |

FOREIGN PATENT DOCUMENTS

| | | | |
|---|---|---|---|
| DE | 10322832 A1 * | 12/2004 | ............ F16K 31/44 |
| EP | 21885 A1 * | 1/1981 | ............ F16K 1/22 |
| EP | 0057780 | 8/1982 | |
| EP | 0612950 | 8/1994 | |
| EP | 1235128 | 8/2002 | |
| EP | 1672261 | 6/2006 | |
| EP | 1701108 | 9/2006 | |
| EP | 1967777 | 9/2008 | |
| EP | 2017512 A1 * | 1/2009 | ............ F16K 31/04 |
| EP | 2088529 | 8/2009 | |
| GB | 2468292 | 9/2010 | |
| JP | 3219185 | 9/1991 | |
| JP | 11280948 A * | 10/1999 | ............ F16K 31/60 |
| JP | 2007108106 | 4/2007 | |
| KR | 2003013488 A * | 2/2003 | ............ F16K 31/60 |
| WO | WO 2010/100403 | 9/2010 | |
| WO | WO 2011/043663 | 4/2011 | |
| WO | WO 2011/066328 | 6/2011 | |

OTHER PUBLICATIONS

Smart-T and MT-Adapt-HW Mounting Adapter, 1 page, prior to Feb. 23, 2011.
U.S. Appl. No. 13/032,856, filed Feb. 23, 2011.
U.S. Appl. No. 29/408,681, filed Dec. 15, 2011.
Honeywell, "Dampers Actuators and Valves," Application and Selection Guide, 295 pages, Jan. 2011.
Honeywell, "Excel 10 W7751H3007 VAV Actuators," Installation Instructions, 10 pages, 2007.
Honeywell, "M5410 C1001/L1001 Small On/Off Linear Valve Actuators," Product Data, 4 pages, 2010.
Honeywell, "M6061 Rotary Valve Actuators," Product Data, 6 pages, 2011.
Honeywell, "ML6420A30xx/ML7420A60xx," Electric Linear Valve Actuators, Installation Instructions, 2 pages, 2010.

(56) References Cited

OTHER PUBLICATIONS

Honeywell, "ML6435B/ML7435 E Electric Linear Actuators for Floating/Modulating Control," Installation Instructions, 2 pages, 2008.
Honeywell, "MT4-024/MT4-230 MT8-024/MT8-230, Small Linear Thermoelectric Actuators," Product Data, 5 pages, 2009.
Honeywell, "MT-Clip—Mounting Clips for MT4/MT8," Mounting Instructions, 1 page, prior to Feb. 23, 2011.
Honeywell, "MT-Clip-ATP—Mounting Clips for MT4/MT8," 2 pages, 2006.
Honeywell, "N20xx/N34xx Non-spring Return Direct-Coupled Damper Actuators," Wiring, 4. pages, 2012.
Honeywell, "Small Linear Thermoelectric Actuator, MT4-024/MT4-230/MT8-024/MT8-230," Mounting Instructions, 2 pages, 2006.
Honeywell, "Small Linear Thermoelectric Actuator, MT4-024/MT4-230/MT8-024/MT8-230," Mounting Instructions, 2 pages, 2007.
Honeywell, "VC2, VC4, VC60, VC8 On-Off Actuator for VC Series Balanced Hydronic Valves," Installation Instructions, 8 pages, 2011.
Honeywell, M5003A, 2 pages, Sep. 2010.
Honeywell, M6410C/L M7410C, 2 pages, prior to Feb. 23, 2011.
Honeywell, M7061 Installation histructions, 2 pages, 2003.
Honeywell, "VC6800, VC6900 Series Floating Control Valves," Product Data, 6 pages, Nov. 1996.
Air Torque, "3-Position $4^{th}$ Generation Actuators (90° Rotation)," 2 pages, prior to Aug. 2, 2013.
Air Torque, "$4^{th}$ Generation Pneumatic Actuator," 20 pages, prior to Aug. 2, 2013.
Bryant, "Healthcare Solutions," 12 pages, prior to Aug. 5, 2013.
CHROMalytic Technology, "Actuators and Accessories; Air Actuators," Australian Distributors; Importers & Manufacturers, pp. 194-211, Downloaded Feb. 2012.
Search Report for Corresponding Application No. 12156608.7-2422 Dated Jun. 1, 2012.

U.S. Appl. No. 29/477,001, filed Dec. 27, 2013.
U.S. Appl. No. 14/133,429, filed Dec. 18, 2013.
U.S. Appl. No. 14/133,441, filed Dec. 18, 2013.
U.S. Appl. No. 14/133,456, filed Dec. 18, 2013.
U.S. Appl. No. 14/133,467, filed Dec. 18, 2013.
U.S. Appl. No. 14/133,482, filed Dec. 18, 2013.
Damper Actuator Google Image Search Results: "https://www.google.com/search?q=damper+actuator&tbm=ish&source=..." 12 pages, Dec. 18, 2013.
Electric Actuator MOD.VB015 "Maintenance and Instillation Instructions of Valbia Electric Actuators" Sections 1.0-8.0 6 pages, downloaded Dec. 18, 2013.
HVAC Actuator Google Image Search Results: "https://www.google.com/search?q=damper+actuator&tbm=ish&source=..." 12 pages, Dec. 18, 2013.
Johnson Controls, "VA-8122 Proportional Valve Actuator," Product/Technical Bulletin, VA-8122, May 2013.
Kromschroder, "Actuators IC 20, IC 40," 3.1.6.4 Edition 05.05 GB, 6 pages, prior to Aug. 8, 2013.
Meto-Fer Automation, "Rotary Actuators," 18 pages, Sep. 2012.
Siemens, "Room Controller RXC32.1/RXC32.5 for VAV Systems with LonMark-Compatible Bus Communication," 14 pages, Jan. 16, 2012.
Siemens, "SQS82 Electronic Valve Actuator," Installation Instructions, Document No. 129-157, Rev. 5, Oct. 2000.
Solidyne, "SMRT Actuator," 00-SMRT-1 Rev-0, 7 pages, 2009.
Valbia Electric Actuators, Bonomi USA, Inc. "General Specifications," N.105, 4 pages, downloaded Dec. 18, 2013.
VICI Valco Instruments Co. Inc., "Multiposition Microelective Valve Actuators Models EMH, EMT, ECMH, and ECMT," VICI AG International, 9 pages, Downloaded Feb. 2012. TN-415 Dec. 2007.
Wilcoxon, "iT Accessories," Rev. A, 2 pp., Nov. 2004.

* cited by examiner

US 8,887,655 B2

VALVE ACTUATOR WITH POSITION INDICATOR EXTENSION

TECHNICAL FIELD

The present disclosure pertains generally to valve actuator assemblies.

BACKGROUND

A variety of systems today include valves, and more particularly, actuatable valves assemblies. Many HVAC systems, for example, include actuatable valves such as air dampers, water valves, gas valves, ventilation flaps, louvers, and/or other actuatable valves that help regulate or control the flow of fluid (e.g. liquid or gas) in the HVAC system. Likewise, fire prevention sprinkler systems often include one or more actuatable valves. In yet another example, many buried sprinkler systems include actuatable valves to control irrigation to lawns and other plants in both residential and commercial settings.

In many cases, valve actuators are installed in locations not readily accessible and/or with poor visibility of the valve actuator. For example, in HVAC systems, the valve actuators are often installed overhead so that only the base or lower portion of the actuator is visible at ground level. Alternatively, or in addition, the valve actuators are installed in cramped spaces within walls, behind equipment, or at other relatively inaccessible places. When so installed, it can be difficult for a service technician to determine the position of the actuator during use. This can increase the time, complexity and cost of commissioning, troubleshooting, and/or servicing the HVAC system in the field.

SUMMARY

The present disclosure relates to a valve actuator assembly that includes an extendable indicator that may be extended to allow a user to more easily determine the current position of the actuator and/or valve from various vantage points. An illustrative, but non-limiting actuator assembly may include an actuator housing having a top portion and a bottom portion, with a side wall extending between the top portion and the bottom portion. A rotatable member may be disposed adjacent to the top portion of the housing, and may rotate along a range of motion as the valve actuator drives a valve between an open position and a closed position. The rotatable member may include an extendable indicator, which may be selectively extended from a retracted position to an extended position. In some cases, when the extendable indicator is in the extended position, the extendable indicator may extend laterally out past the side wall of the actuator housing along at least a major portion of the range of motion of the rotatable member. This may increase the visibility of the position of the rotatable member from various vantage points, including from below the bottom portion of the housing.

The above summary is not intended to describe each disclosed embodiment or every implementation of the disclosure. The Description which follows more particularly exemplifies these embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

Figure 1:
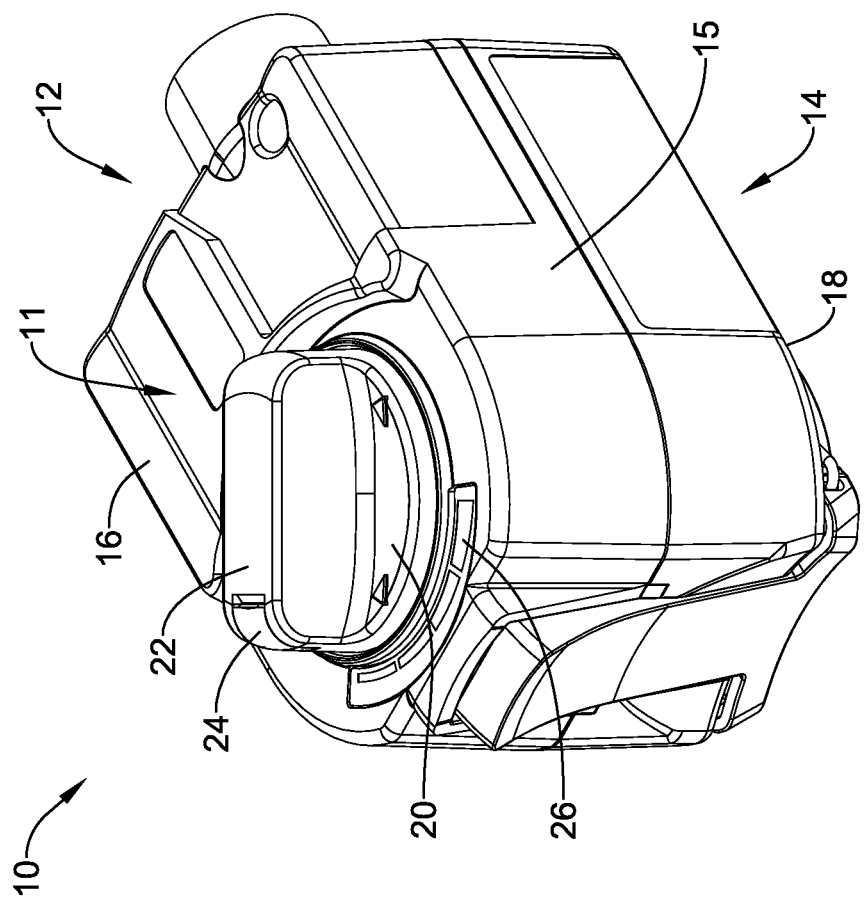
FIG. 1 is a top perspective view of an illustrative but non-limiting valve actuator.

While the disclosure is amenable to various modifications and alternative forms, specifics thereof have been shown by way of example in the drawings and will be described in detail. It should be understood, however, that the intention is not to limit the disclosure to the particular example embodiments described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict selected embodiments and are not intended to limit the scope of the disclosure. Although examples of construction, dimensions, and materials are illustrated for the various elements, those skilled in the art will recognize that many of the examples provided have suitable alternatives that may be utilized.

Figure 1A:
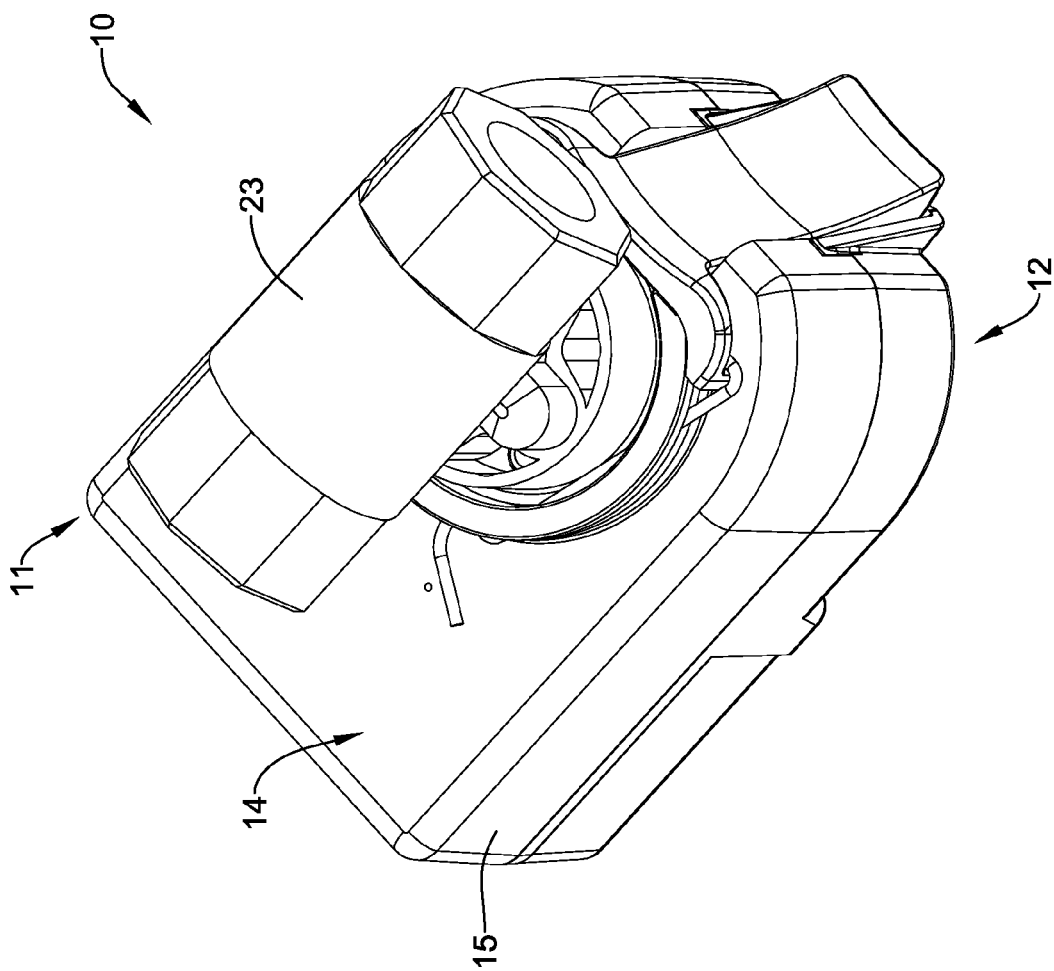
FIG. 1A is a bottom perspective view of the illustrative valve actuator assembly connected to a valve.

FIG. 1 is a top perspective view of an illustrative valve actuator assembly 10, which includes a rotatable member 20 and an extendable indicator arm 24. FIG. 1A is a bottom perspective view of the illustrative valve actuator assembly 10 connected to a valve 23. While the inner structure and components of the valve actuator assembly 10 are not illustrated, it should be understood that the valve actuator assembly 10 includes the structural and electrical components necessary to drive the valve 23 between a first position (e.g. an open position) and a second position (e.g. a closed position). In some cases, this may include an electric motor and/or one or more gears as a drive mechanism. The valve 23 may have a rotatable input (e.g. rotatable shaft), which when rotated by a rotatable output 21 (see FIG. 3) of the valve actuator assembly 10, may move the valve 23 between the first position and the second position. It is contemplated that the valve 23 may be opened or closed, as desired, to permit or stop a fluid, such as water, air, or gas. The valve 23 may be any type of valve, such as a gate or ball valve, a plug or globe valve, or any other type of valve (such as a damper for use in an air duct). In some cases, the valve actuator assembly 10 may receive control signals from a controller, such as an HVAC controller, to control the position of the valve 23 as part of an overall controlled system. In some instances, the valve actuator assembly 10 may operate as described in U.S. patent application Ser. No. 13/032,856, filed Feb. 23, 2011, and entitled "VALVE ACTUATOR ASSEMBLY WITH TOOL-LESS INTERCONNECT", which is incorporated herein by reference, but may further include an extendable indicator arm 24, as further described below.

The illustrative valve actuator assembly 10 of FIG. 1 includes a housing 11 having a top portion 12, a bottom portion 14, and one or more side walls 15 extending between the top portion 12 and the bottom portion 14 of the housing 11. The top portion 12 may include a top surface 16 having a rotatable member 20 situated adjacent thereto. The rotatable member 20 may be operatively coupled to a rotatable output, such as rotatable output 21 of FIG. 3, which may be operatively coupled to a rotatable input of a valve 23. A drive mechanism (not shown) may be provided in the housing 11 of valve actuator assembly 10 for driving the rotatable output 21 of the valve actuator assembly 10, and thus the rotatable input of a connected valve 23, so as to achieve a proper position of the valve 23. In some cases, the rotatable output 21 of the valve actuator assembly 10 may include a valve actuator shaft, and the rotatable member 20 may be coupled to and rotate commensurately with (1:1, 1:2, 1:3, 2:1, 3:1 or any other desired ratio) the valve actuator shaft, but this is not required. In some instances, the rotatable member 20 may provide an indication 26 (see FIG. 2) of the current position of the internal components of the valve actuator assembly 10, and thus the valve 23 (i.e., whether the valve is open, closed, or at some intermediate position).

In some embodiments, the rotatable member 20 may allow a user to manually actuate the valve actuation shaft, and thus manually move the valve 23 between the first and second positions, but this is not required. This may be useful in the event of actuator or power failure, during diagnostic or troubleshooting, or for any other reason, as desired. It is contemplated that other movable elements may be used in place of, or in addition to, the rotatable member 20 for allowing a user to manually manipulate the position of the valve actuator assembly 10. In some instances, the rotatable member 20 may include a raised portion 22 to facilitate a user in grasping and rotating the rotatable member 20, but this is not required. In some cases, the valve actuator assembly 10 may not include any special features that enable a user to manually manipulate the position of the valve actuator assembly 10.

In some cases, the valve actuator assembly 10 may include markings 26 (see FIG. 2) on the top surface 16 of the housing 11, adjacent to the rotatable member 20. These markings 26 may serve to show a current position of the internal components of the valve actuator assembly 10, and thus the valve 23 (i.e., whether the valve is open, closed, or at some intermediate position). In one example, the position of the valve actuator assembly 10 of FIG. 1 may correspond to a closed valve position, and the position of the valve actuator assembly 10 of FIG. 4 may correspond to an open valve position.

In some embodiments, the raised portion 22 (or another portion) of the rotatable member 20 may include an extendable indicator arm 24, which may be extended from and/or retracted into the raised portion 22 (or another portion) of the rotatable member 20, as desired. It is contemplated that in some instances such as where a compact product is desired or when the rotatable member 20 is already visible, the extendable indicator arm 24 may remain in the retracted position, such as shown in FIG. 1. In some instances, such as where visibility from the bottom portion 14 (or other vantage point) is desired, the extendable indicator arm 24 may be extended, as shown in FIG. 4, which may provide a user with a mechanism to determine the valve position without having visual access to the top portion 12 of the valve actuator assembly 10.

Figure 2:
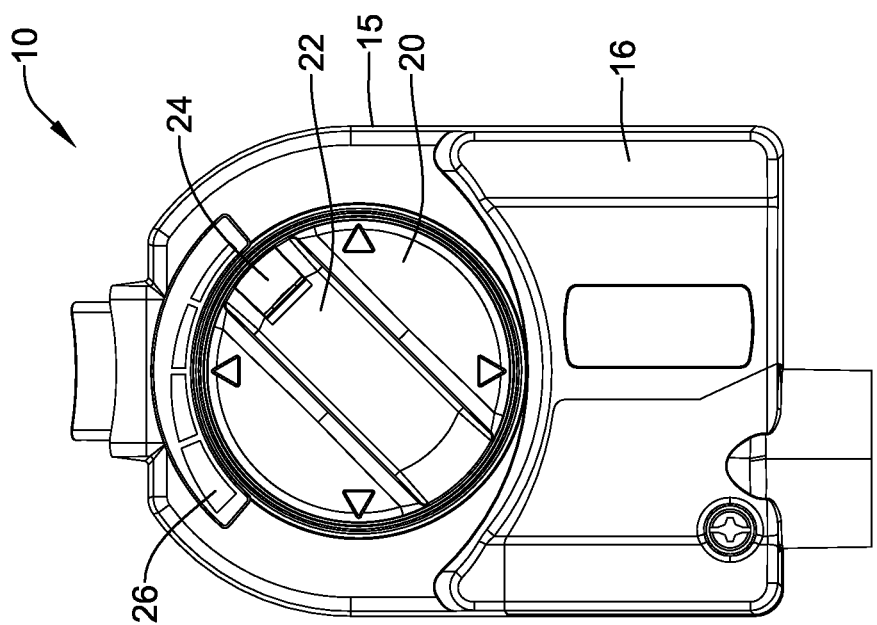
FIG. 2 is a top view of the illustrative but non-limiting valve actuator of FIG. 1.

FIG. 2 shows a top view of the illustrative but non-limiting valve actuator of FIG. 1. As can be seen in FIG. 2, the valve actuator assembly 10 may include markings, such as markings 26 or some other type of indicator, on the top surface 16 of the housing 11, such that a user may be able to quickly identify the current position of the valve 23 (e.g. open/closed). The markings 26 may also allow a user to identify correct operation of the valve actuator assembly 10. For example, in an HVAC system, a service technician may use the markings 26 in conjunction with the current position of the rotatable member 20 to quickly identify the position of a connected valve 23 when commissioning, troubleshooting, and/or servicing an HVAC system in the field.

Figure 3:
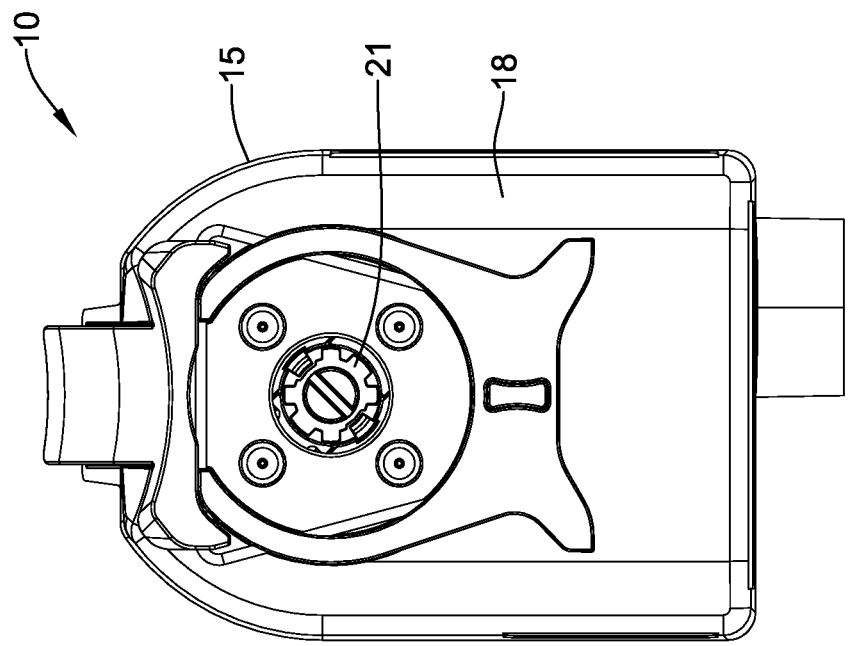
FIG. 3 is a bottom view of the illustrative but non-limiting valve actuator of FIG. 1.

In the event the top surface 16 of the housing 11 of the valve actuator assembly 10 is not readily visible to the user, such as when the valve actuator assembly 10 is installed above the user and the top portion 12 of the valve actuator assembly 10 is facing away from the user, it may be difficult for the user to determine the current position of the valve actuator assembly 10 and thus the connected valve 23. When so installed, only the bottom surface 18 of the valve actuator assembly 10 may be visible to the user, such as is illustrated in FIG. 3. As can be seen in FIG. 3, neither the rotatable member 20 nor any markings (markings 26 or otherwise) are visible to the user from the bottom side of the housing 11. This can make commissioning, troubleshooting, and/or servicing of the valve actuator assembly 10 more difficult and/or more time consuming.

Figure 4:
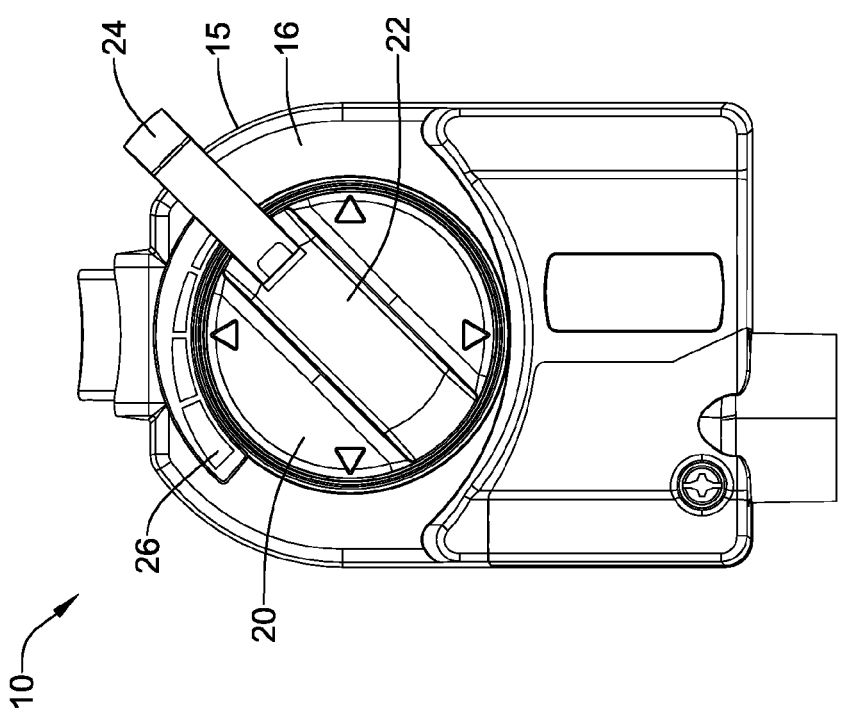
FIG. 4 is a top view of the valve actuator of FIG. 1, with the rotatable member in a first position, and the extendable indicator arm in the extended position.
Figure 4A:
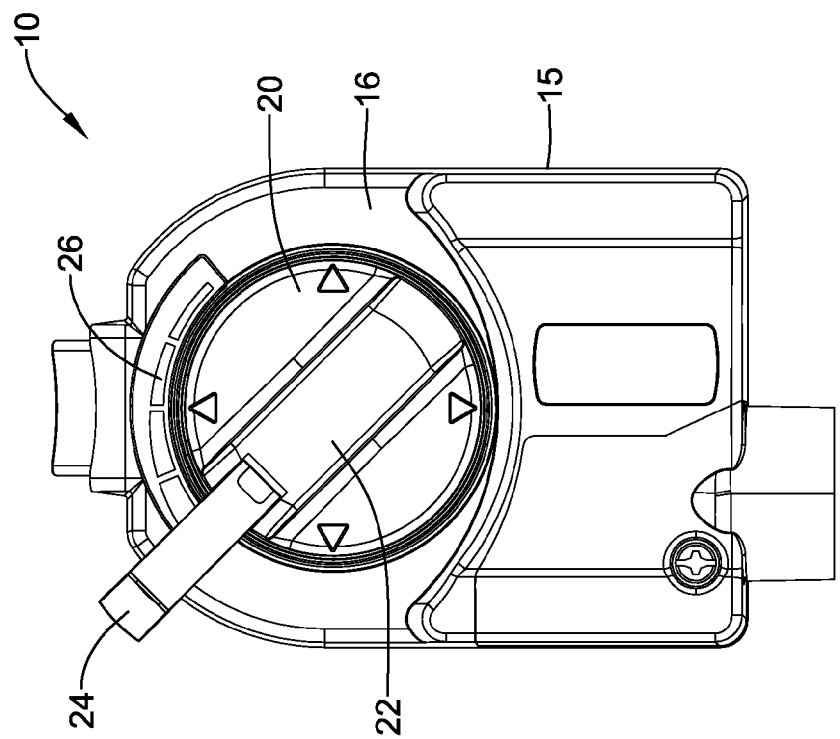
FIG. 4A is a top view of the valve actuator of FIG. 4 with the rotatable member in a second position, and the extendable indicator arm in the extended position.

FIG. 4 illustrates a top view of the illustrative valve actuator assembly 10, with the rotatable member 20 in a first position (e.g. valve closed position), and the extendable indicator arm 24 in an extended position. When the valve actuator assembly 10 is in the first position (e.g. valve closed position), the extendable indicator arm 24 may extend out laterally past the side walls 15 of the housing 11 of the valve actuator assembly 10, and may be visible from the bottom side of the housing 11 of the valve actuator assembly 10. When the valve actuator assembly 10 is in a second position (e.g. valve open position), such as illustrated in FIG. 4A, the extendable indicator arm 24 may also extend out laterally past the side walls 15 of the housing 11 of the valve actuator assembly 10.

It is contemplated that rotatable member 20 may be rotated along a range of motion during use. The range of motion may correspond to moving the valve 23 between fully open, partially open, partially closed, fully closed, and/or any sub-range thereof. In some cases, it is contemplated that, when the extendable indicator arm 24 is in the extended position, the extendable indicator arm 24 may extend laterally out past the side walls 15 of the housing 11 of the valve actuator assembly 10 along at least a major portion (i.e. greater than 50%) of the range of motion of the rotatable member 20. It is contemplated that the extendable indicator arm 24 may extend laterally out past the side walls 15 of the housing 11 along at least 20%, 30%, 40%, 50%, 60%, 70%, 80%, or 90% of the range of motion of the rotatable member 20. In some cases, the extendable indicator arm 24 may extend laterally out past the side walls 15 of the housing 11 along the entire (i.e. 100%) of the range of motion of the rotatable member 20, but this is not required.

Figure 5:
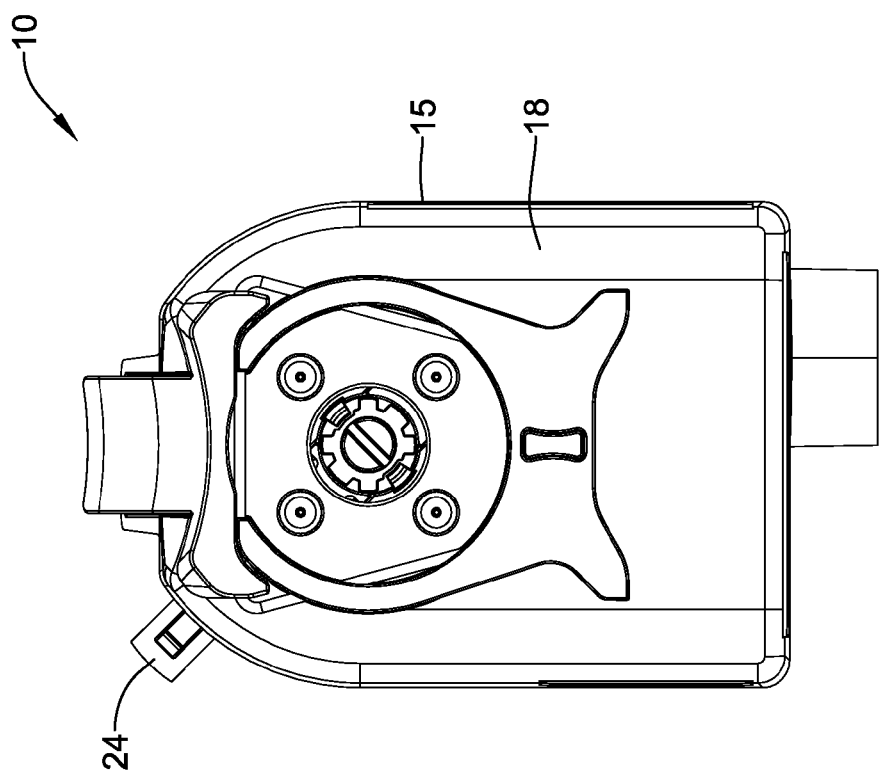
FIG. 5 is a bottom view of the illustrative valve actuator of FIG. 4 with the rotatable member in the first position, and the extendable indicator arm in the extended position.
Figure 5A:
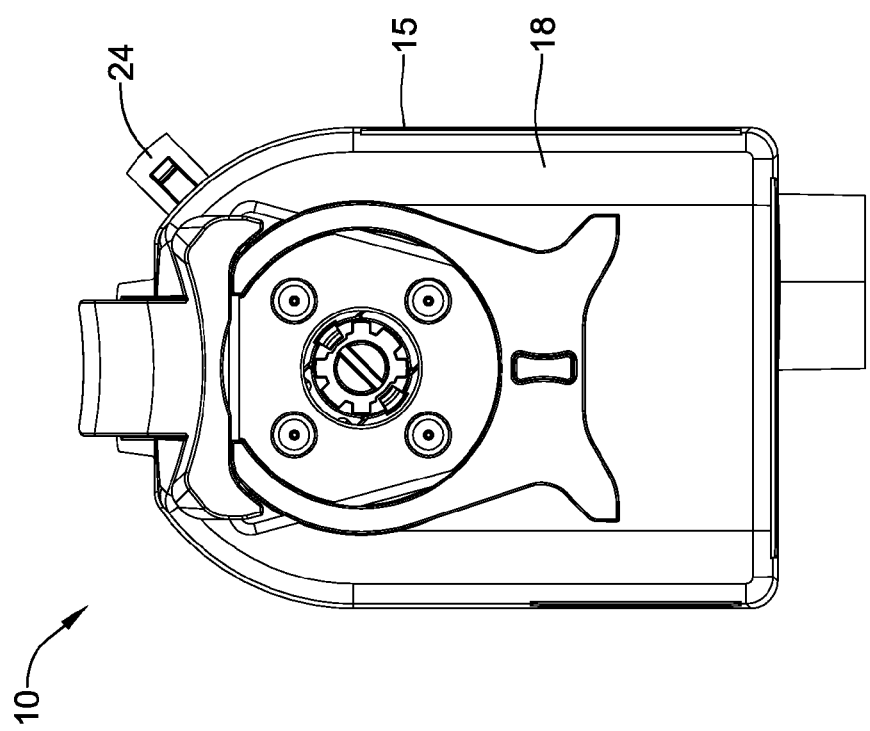
FIG. 5A is a bottom view of the illustrative valve actuator of FIG. 4 with the rotatable member in a second position, and the extendable indicator arm in the extended position.

FIG. 5 illustrates a bottom view of the illustrative valve actuator assembly 10 of FIG. 4 with the rotatable member 20 in the first position (see FIG. 4), and the extendable indicator arm 24 in the extended position. As can be seen, when in the extended position, the extendable indicator arm 24 may extend past the side wall 15 of the housing 11 of the valve actuator assembly 10 such that the extendable indicator arm 24 is visible from the bottom side (below the bottom portion 14) of the valve actuator assembly 10. When the valve actuator assembly 10 is in a first position (e.g. closed), the extendable indicator arm 24 may extend over a first side of the housing 11 of the valve actuator assembly 10. As illustrated in FIG. 5A, when the valve actuator assembly 10 is in a second position (see FIG. 4A), the extendable indicator arm 24 may extend over a second side of the housing 11 of the valve actuator assembly 10. It is contemplated that rotatable member 20 may be positioned at any point between the first and second positions, such that the valve actuator assembly 10 and/or connected valve 23 may be, for example, in a partially open and/or partially closed positioned, as desired. While not explicitly shown, it is contemplated that the housing 11 of the valve actuator assembly 10 may include markings similar to markings 26 or other position indicators on the bottom surface 18 of the housing 11 so that the user may more easily identify the current position of the extendable indicator arm 24 from the bottom side of the housing 11.

Figure 6:
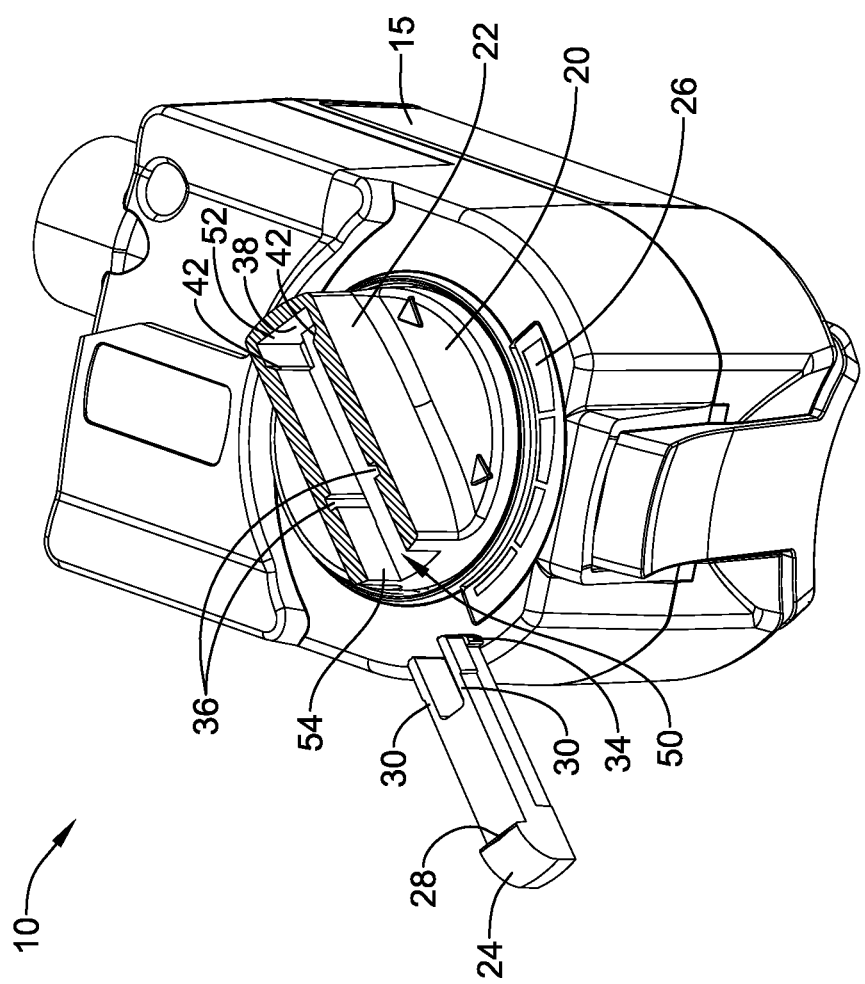
FIG. 6 is a partial cross-sectional view of an illustrative valve actuator with a rotatable member having an indicator arm removed.
Figure 7:
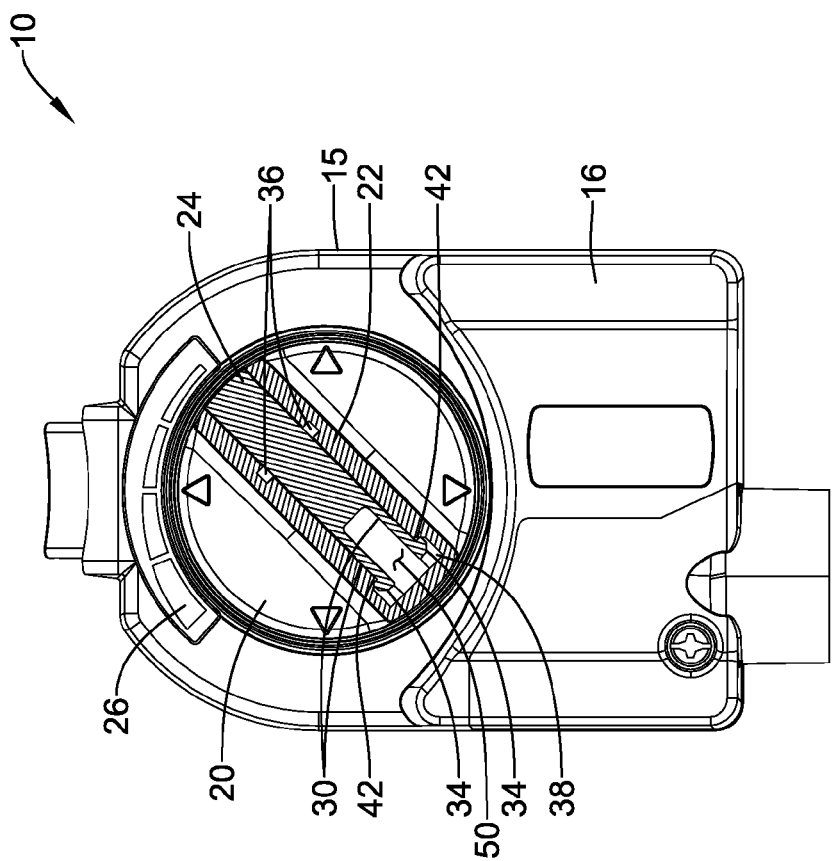
FIG. 7 is a partial cross-sectional view of an illustrative valve actuator with a rotatable member having an indicator arm in a retracted position.
Figure 8:
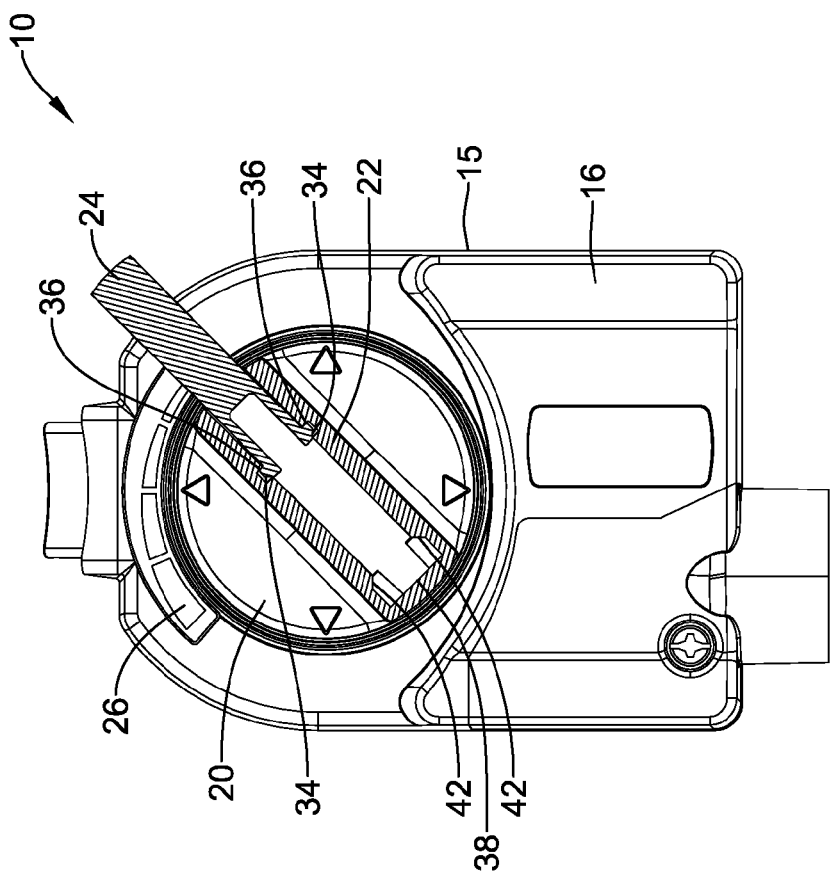
FIG. 8 is a partial cross-sectional view of an illustrative valve actuator with a rotatable member having an indicator arm in an extended position.

FIGS. 6-8 illustrate one example extendable indicator arm 24 construction. However, it should be understood that any suitable construction may be used to form an extendable indicator arm, which can assume a retracted position and an extended position. For example, in FIGS. 6-8, the extendable indicator arm 24 is slidably received by the rotatable member 20. In other instances, the extendable indicator arm 24 may be pivotally connected to and rotate out from the rotatable member 20, may telescope out from the rotatable member 20, or assume any other suitable construction, as desired.

In FIG. 6, and to better show the construction of the extendable indicator arm 24, the top surface of the raised portion 22 of the rotatable member 20 has been removed. In FIG. 6, the extendable indicator arm 24 is structured to be pocketed inside a channel 50 in the rotatable member 20. In other embodiments, however, the raised portion 22 of the rotatable member 20 may not encase the extendable indicator arm 24. For example, in some instances, the raised portion 22 of the rotatable member 20 may be an open channel. Also, it is contemplated that the extendable indicator arm 24 may be received by or connected to a different part of the rotatable member 20, especially when the rotatable member 20 does not include a raised portion 22.

In any event, and in the illustrative embodiment shown in FIG. 6, the rotatable member 20 may include a channel 50 extending from a first end 52 to a second end 54. The second end may be open. In the embodiment shown, the first end 52 of the channel 50 may include a flared or expanded region 38. In some embodiments, the channel 50 may include a pair of intermediate recesses or channels 36 situated on either side of the channel 50 at a location between the first end 52 and the second end 54. The extendable indicator arm 24 may include a pair of flexible members 30, sometimes including a pair of tabs 34 adjacent a distal end thereof. Expanded region 38 and intermediate recesses 36 may be configured to engage tabs 34 on the extendable indicator arm 24. In some embodiments, the extendable indicator arm 24 may also include a raised portion 28. When provided, raised portion 28 may provide a region for a user to engage the extendable indicator arm 24 and manipulate the extendable indicator arm 24 between the retracted to the extended position.

When the extendable indicator arm 24 is in the retracted position, such as illustrated in FIG. 7, tabs 34 of the flexible members 30 may engage the expanded or flared region 38 of the channel 50. The tabs 34 may remain engaged with the expanded or flared region 38 until enough force is applied (along the longitudinal axis of the extendable indicator arm 24) to the extendable indicator arm 24 to cause the flexible members 30 to bend inward toward one another, allowing the tabs 34 to disengage from the expanded or flared region 38. To facilitate the disengagement, and in some embodiments, the expanded or flared region 38 may include tapered edges 42. In some instances, the tapered edges 42 may allow the extendable indicator arm 24 to more easily disengage from the expanded or flared region 38 in response to an applied force, and move toward the extended position. That is, when a force is exerted on the extendable indicator arm 24 (e.g. the extendable indicator arm 24 is pulled and/or pushed into the extended position), the flexible members 30 may bend inwards, allowing the tabs 34 to slide along the tapered edges 42 and disengage from the expanded or flared region 38 and move along the inner walls of the channel 50 towards intermediate recesses 36.

Once the tabs 34 are adjacent to the intermediate recesses 36, the tabs 34 may engage the recesses 36, such as shown in FIG. 8, and stop travel of the extendable indicator arm 24 and maintain the extendable indicator arm 24 in the extended position. The intermediate recesses 36 and tabs 34 may engage in such a manner that a greater force is required to fully remove the extendable indicator arm 24 than the force required to return the extendable indicator arm 24 to its retracted position. In some cases, and as best shown in FIG. 7, the terminal ends of the tabs 34 (i.e. the edges facing toward the terminal ends of the flexible members 30) may include a taper to help reduce the force required to disengage the tabs 34 from the intermediate recesses 36 when attempting to move the extendable indicator arm 24 from the extended position toward the retracted position.

In some cases, if the extendable indicator arm 24 encounters a perpendicular force in its plane of rotation (e.g. encounters a fixed object while the valve actuator assembly 10 is rotating the rotatable member 20), the flexible members 30 may bend and the tabs 34 may disengage from the recesses 36, allowing the extendable indicator arm 24 to completely disengage from the rotatable member 20, without causing damage to the rotatable member 20 and without causing interruption to the operation of the valve actuator assembly 10. In some cases, the rotatable member 20 may be constructed rigid enough to allow for manual operation of the rotatable member 20, both with and without the extendable indicator arm 24 present.

It should be understood that this disclosure is, in many respects, only illustrative. The various individual elements discussed above may be arranged or configured in any combination thereof without exceeding the scope of the disclosure. Changes may be made in details, particularly in matters of shape, size, and arrangement of steps without exceeding the scope of the disclosure. The disclosure's scope is, of course, defined in the language in which the appended claims are expressed.

We claim:

1. A valve actuator assembly for rotating a rotatable input of a valve, the valve actuator assembly comprising:
    a rotatable output couplable to the rotatable input of a valve;

a drive mechanism for rotating the rotatable output;

an actuator housing having a top portion and a bottom portion, with a side wall extending between the top portion and the bottom portion;

a rotatable member disposed adjacent the top portion of the actuator housing, the rotatable member rotating with rotation of the rotatable output along a range of motion; and an extendable indicator arm that is selectively extendable from the rotatable member, the extendable indicator arm having a retracted position and an extended position, wherein the extendable indicator arm is slidably disposed within a channel in the rotatable member.

2. The valve actuator assembly of claim 1, wherein, when the extendable indicator arm is in the extended position, the extendable indicator arm extends laterally past the side wall of the actuator housing along at least a major portion of the range of motion of the rotatable member.

3. The valve actuator assembly of claim 2, wherein, when the extendable indicator arm is in the extended position, the extendable indicator arm is visible from the bottom portion of the actuator housing along at least a major portion of the range of motion of the rotatable member.

4. The valve actuator assembly of claim 1, wherein the extendable indicator arm has a first end and a second end, wherein the second end includes a pair of flexible members.

5. The valve actuator assembly of claim 4, further comprising an outwardly extending tab disposed on each of the flexible members.

6. The valve actuator assembly of claim 5, wherein the channel in the rotatable member extends from an inward end having a tapered enlarged region to an outward end that exits the rotatable member.

7. The valve actuator assembly of claim 6, further comprising a pair of intermediate recesses disposed within the channel between the inward end and the outward end.

8. The valve actuator assembly of claim 7, wherein the outwardly extending tabs of the flexible members are configured to selectively engage the enlarged region of the channel in the retracted position and the intermediate recesses of the channel in the extended position.

9. A valve actuator assembly, for connection to a valve, the valve actuator assembly comprising:

an actuator housing having a top portion and a bottom portion, with a side wall extending between the top portion and the bottom portion;

a rotatable member disposed adjacent the top portion of the actuator housing, the rotatable member including a channel, the channel having a first end to a second end, the rotatable member rotating along a range of motion;

an extendable indicator arm slidably disposed within the channel of the rotatable member, the extendable indicator arm configured to slide between a retracted position and an extended position;

wherein, when the extendable indicator arm is in the extended position, the extendable indicator arm extends laterally out past the side wall of the actuator housing along at least a major portion of the range of motion of the rotatable member.

10. The valve actuator assembly of claim 9, wherein, when the extendable indicator arm is in the retracted position, the extendable indicator arm does not extend laterally out past the side wall of the actuator housing along the range of motion of the rotatable member.

11. The valve actuator assembly of claim 9, wherein the first end of the channel includes an enlarged region.

12. The valve actuator assembly of claim 11, further comprising a first intermediate recess disposed on a first side of the channel and a second intermediate recess disposed on the second side of the channel, the first and second intermediate recesses disposed intermediate between the first end of the channel and the second end of the channel.

13. The valve actuator assembly of claim 11, wherein the extendable indicator arm has a first end and a second end, the second end of the extendable indicator arm includes a first flexible member and a second flexible member, with a first tab extend laterally out from the first flexible member and a second tab extending laterally out from the second flexible member.

14. The valve actuator assembly of claim 13, wherein, when the extendable indicator arm is in the retracted position, the first tab and the second tab engage the enlarged region of the channel.

15. The valve actuator assembly of claim 13, wherein, when the extendable indicator arm is in the extended position, the first tab and the second tab engage the intermediate recesses in channel.

16. A valve actuator assembly, for connection to a valve, the valve actuator assembly comprising:

a rotatable output couplable to a valve for setting a current position of the valve;

an actuator housing having a top portion and a bottom portion, with a side wall extending between the top portion and the bottom portion;

a rotatable member disposed adjacent the top portion of the actuator housing, the rotatable member rotating with rotation of the rotatable output along a range of motion and indicating the current position of the valve; and an extendable indicator that is slidably received by the rotatable member and that is selectively extendable from the rotatable member between a retracted position and an extended position, wherein when the extendable indicator is in the extended position, the extendable indicator extends laterally out past the side wall of the actuator housing along at least a major portion of the range of motion of the rotatable member, and when the extendable indicator is in the retracted position, the extendable indicator does not extend laterally out past the side wall of the actuator housing.

17. The valve actuator assembly of claim 16, wherein, in the extended position, the extendable indicator releases from the rotatable member if a sufficient lateral force is applied to the extendable indicator without causing damage to the rotatable member.

* * * * *